(12) United States Patent
Rullaud et al.

(10) Patent No.: US 10,036,552 B2
(45) Date of Patent: Jul. 31, 2018

(54) INJECTION SYSTEM FOR A COMBUSTION CHAMBER OF A TURBINE ENGINE, COMPRISING AN ANNULAR WALL HAVING A CONVERGENT INNER CROSS-SECTION

(71) Applicants: SNECMA, Paris (FR); OFFICE NATIONAL D'ETUDES ET DE RECHERCHES AEROSPATIALES, Chatillon (FR)

(72) Inventors: Matthieu Francois Rullaud, Champagne sur Seine (FR); Didier Hernandez, Quiers (FR); Christian Guin, Villebon sur Yvette (FR)

(73) Assignees: SNECMA, Paris (FR); OFFICE NATIONAL D'ETUDES ET DE RECHERCHES AEROSPATIALES, Chatillon (FR)

( * ) Notice: Subject to any disclaimer, the term of this patent is extended or adjusted under 35 U.S.C. 154(b) by 360 days.

(21) Appl. No.: 14/778,412

(22) PCT Filed: Mar. 14, 2014

(86) PCT No.: PCT/FR2014/050603
§ 371 (c)(1),
(2) Date: Sep. 18, 2015

(87) PCT Pub. No.: WO2014/147325
PCT Pub. Date: Sep. 25, 2014

(65) Prior Publication Data
US 2016/0281991 A1 Sep. 29, 2016

(30) Foreign Application Priority Data
Mar. 19, 2013 (FR) ...................... 13 52442

(51) Int. Cl.
*F23R 3/34* (2006.01)
*F23R 3/28* (2006.01)
(Continued)

(52) U.S. Cl.
CPC ................ *F23R 3/286* (2013.01); *F02C 7/22* (2013.01); *F23D 11/105* (2013.01); *F23R 3/10* (2013.01);
(Continued)

(58) Field of Classification Search
CPC .. F23R 3/286; F23R 3/10; F23R 3/343; F02C 7/22; F23D 11/105; F23D 2900/00015;
(Continued)

(56) References Cited

U.S. PATENT DOCUMENTS 3,474,970 A * 10/1969 Hogg .................... F23D 11/107
239/404
3,498,059 A * 3/1970 Gradon et al. .......... F23D 11/24
60/742

(Continued)

FOREIGN PATENT DOCUMENTS

| CN | 1034039 A | 7/1989 |
| CN | 1502797 A | 6/2004 |

(Continued)

OTHER PUBLICATIONS

International Search Report dated Jun. 12, 2014 in PCT/FR2014/050603 filed Mar. 14, 2014.
(Continued)

*Primary Examiner* — Ted Kim
(74) *Attorney, Agent, or Firm* — Oblon, McClelland, Maier & Neustadt, L.L.P.

(57) ABSTRACT

An air and fuel injection system for a turbine engine combustion chamber dome, including at least two fuel injection devices including a central injector and a periph- (Continued)

eral annular injector arranged around the central injector, and an inner annular air inlet channel into which the central injector opens up to enable mixing between the fuel from the central injector and the air inlet into the inner annular channel, and at least one outer annular air inlet channel to enable enrichment of this mix with air and to stabilize the pilot combustion zone, wherein the inner annular channel and at least one outer annular channel are separated by an intermediate annular wall extending around the central injector and having a convergent inner profile.

6 Claims, 4 Drawing Sheets

(51) Int. Cl.
   *F23D 11/10* (2006.01)
   *F02C 7/22* (2006.01)
   *F23R 3/10* (2006.01)

(52) U.S. Cl.
   CPC .......... *F23R 3/343* (2013.01); *F05D 2220/30* (2013.01); *F05D 2240/35* (2013.01); *F23D 2206/10* (2013.01); *F23D 2900/00015* (2013.01); *F23D 2900/11002* (2013.01); *Y02E 20/344* (2013.01)

(58) Field of Classification Search
   CPC ....... F23D 2206/10; F23D 2900/11002; Y02E 20/344; F05D 2220/30; F05D 2240/35
   USPC .......................................................... 60/742
   See application file for complete search history.

(56) References Cited

U.S. PATENT DOCUMENTS

| | | | |
|---|---|---|---|
| 3,684,186 A | | 8/1972 | Helmrich |
| 4,562,698 A | * | 1/1986 | Halvorsen ............... F23D 11/24 60/742 |
| 4,996,837 A | * | 3/1991 | Shekleton ................ F23R 3/14 60/742 |
| 5,833,141 A | | 11/1998 | Bechtel, II et al. |
| 6,543,235 B1 | | 4/2003 | Crocker et al. |
| 6,986,255 B2 | | 1/2006 | Smith et al. |
| 7,434,401 B2 | * | 10/2008 | Hayashi ..................... F23R 3/32 60/743 |
| 8,001,786 B2 | * | 8/2011 | Oda ........................ F23R 3/50 60/742 |
| 8,186,163 B2 | | 5/2012 | Hernandez |
| 8,661,829 B2 | | 3/2014 | Bourgois et al. |
| 8,955,326 B2 | | 2/2015 | Bourgois et al. |
| 8,959,772 B2 | | 2/2015 | Hernandez |
| 9,097,425 B2 | | 8/2015 | Hernandez et al. |
| 2002/0011064 A1 | | 1/2002 | Crocker et al. |
| 2002/0162333 A1 | | 11/2002 | Zelina |
| 2003/0221429 A1 | | 12/2003 | Laing et al. |
| 2008/0173019 A1 | | 7/2008 | Kobayashi et al. |
| 2009/0078797 A1 | | 3/2009 | Hernandez et al. |
| 2010/0115956 A1 | * | 5/2010 | Toon ...................... F23D 11/383 60/742 |
| 2012/0198852 A1 | | 8/2012 | Hernandez et al. |
| 2012/0304649 A1 | | 12/2012 | Matsuyama et al. |
| 2012/0304650 A1 | | 12/2012 | Hernandez et al. |
| 2013/0152593 A1 | * | 6/2013 | Oskam ..................... F23R 3/28 60/742 |
| 2014/0096502 A1 | * | 4/2014 | Karlsson ................ F23R 3/286 60/746 |

FOREIGN PATENT DOCUMENTS

| | | | |
|---|---|---|---|
| CN | 102575844 A | | 7/2012 |
| CN | 102782411 A | | 11/2012 |
| DE | 21 31 490 C2 | | 10/1983 |
| EP | 1 413 830 A2 | | 4/2004 |
| EP | 2463697 9 | * | 4/2012 |
| EP | 2 530 382 A2 | | 12/2012 |
| FR | 2 958 015 | | 9/2011 |
| WO | 01/51787 A1 | | 7/2001 |

OTHER PUBLICATIONS

Preliminary French Search Report dated Oct. 18, 2013 in FR 1352442 filed Mar. 19, 2013.
Combined Office Action and Search Report dated Sep. 23, 2016 in Chinese Patent Application No. 201480017161.X (with English language translation).

* cited by examiner

STATE OF THE ART

STATE OF THE ART

INJECTION SYSTEM FOR A COMBUSTION CHAMBER OF A TURBINE ENGINE, COMPRISING AN ANNULAR WALL HAVING A CONVERGENT INNER CROSS-SECTION

TECHNICAL DOMAIN

This invention relates to the domain of turbine engine combustion chambers and more particularly the domain of air and fuel injection systems in these combustion chambers.

The invention is applicable to any type of land or aeronautical turbine engine and particularly to aircraft turbine engines such as turbojets and turboprops.

The invention more precisely relates to double fuel injection circuit injection systems that comprise a central injector, frequently called a pilot injector, outputting an optimised permanent fuel flow for low regimes and a peripheral annular injector also called the main injector, that outputs an intermittent fuel flow optimised for high regimes, this peripheral injector for example being of the type currently called a multipoint injector.

These injection systems were developed to enable combustion chambers to operate with an air and fuel mix with low fuel content (currently referred to as combustion chambers with staged lean combustion), and more generally for better adaptation of air and fuel injection at different operating regimes of combustion chambers in order to reduce their fuel consumption and emission of pollutants such as nitrogen oxides and exhaust gases, and to satisfy regulatory standards on polluting emissions generated at high power.

STATE OF PRIOR ART

Injection systems of the type mentioned above are already known in prior art, particularly as disclosed in French patent application FR 2 958 015 A1.

FIG. 1 illustrates an example of an annular staged lean combustion chamber 10 for a turbine engine. The annular combustion chamber 10 normally comprises two annular walls, the inner wall 12 and the outer wall 14 that delimit it and are connected at the upstream end to a chamber dome annular wall 16, and at the downstream end to an outer casing 18 of the turbine engine and to an inner shell 20 respectively, the inner shell being connected to a diffuser 22 arranged upstream from the combustion chamber 10 and that will diffuse compressed air originating from a compressor of the turbine engine (not shown in FIG. 1) into this combustion chamber in a manner well known in itself.

The chamber dome 16 usually comprises uniformly distributed orifices about the axis of the chamber in which air and fuel injection systems 24 are installed, each of which will create a flame in the combustion chamber 10.

The injection systems 24 of the combustion chamber 10 shown in FIG. 1 are of the type comprising a central injector, also called a pilot injector and a peripheral annular injector also called the main injector, the latter being of the multipoint type in this case.

As shown more specifically in FIG. 2 that is a larger scale view of the injection system 24 shown in FIG. 1, the central fuel injector 26 is composed of a nozzle opening up onto a central axis 28 of the system, that approximately forms an axis of symmetry for parts of revolution making up the injection system 24.

This central injector 26 is usually associated with two air inlet channels including an inner channel 29 into which the central injector 26 opens up such that the fuel sprayed by this central injector 26 can be mixed immediately with air inlet into this channel, and an outer annular channel 30 that opens up at the downstream end into the injection system 24 to enable subsequent enrichment of the air and fuel mix with air.

Oblique fins 32 and 34 usually pass through the two air inlet channels 29 and 30 mentioned above to create a swirling movement about the central axis 28 in the injection system 24 on the air flow that passes between them to facilitate homogenisation of the air and fuel mix in the injection system.

Each of the two inlet channels 29 and 30 mentioned above is thus frequently called a swirler, and it is usually delimited on the outer part by an annular wall 36 or 38 respectively, with an inner convergent divergent profile, sometimes called a Venturi, designed particularly to prevent flames from returning into the injection system 24 by inducing an acceleration of the flow close to the downstream end of the nose of the fuel injector.

In the example shown in FIG. 2, the two air inlet channels 29 and 30 and the annular walls 36 and 38 that delimit them, extend approximately along the axis 28 of the injection system.

The central fuel injector 26 is usually supplied by a conduit 40 partially housed in an arm 42 supported by the outer casing 18 of the combustion chamber 10 (see FIG. 1).

Furthermore, the peripheral or multipoint fuel injector 43 is composed of an annular row of fuel ejection orifices 44 that may for example be formed in a tapered upstream portion 46 of the wall 38 delimiting the outer annular passage 30 (see FIG. 2).

The fuel ejection orifices 44 of the peripheral injector 43 communicate with an annular distribution cavity 48, supplied with fuel through a conduit 50 partially formed in the arm 42, and these fuel ejection orifices 44 open up into a peripheral annular channel 52 in which there is an annular space 53 for inlet of an air flow that will be mixed in said channel 52 with fuel output from said peripheral injector 43.

Oblique fins 54 pass through the annular air inlet space 53 mentioned above to force a swirling movement on the air flow passing between them about the central axis 28 of the injection system 24.

The peripheral annular channel 52 is delimited on its inner surface by the annular wall 38 and on its outer surface by a bowl 56 tapered outwards towards the downstream direction and supporting means 58 that can be used to install the injection system 24 in the dome 16 of the combustion chamber 10.

In the example shown in FIGS. 1 and 2, the annular air inlet space 53 is tapered in shape and is delimited on the inside by the tapered portion 46 of the annular wall 38 so as to expose an opening facing radially outwards.

During operation, fuel enters the peripheral annular channel 52 through fuel ejection orifices 44 in the peripheral injector 43 and this fuel then mixes with the air flow circulating in channel 52, and this facilitates atomisation of this fuel, in other words spraying of this fuel in the form of fine droplets.

In general, in injection systems comprising two fuel injection circuits for example such as the injection system 24 described above, the central injector or pilot injector 26 outputs a fuel flow that is fairly constant at all operating regimes of the combustion chamber and that is optimised for the low regimes, while the peripheral or principal injector 43 outputs a large fuel flow at high regime that is optimised for this type of regime, and does not output any fuel at low regime. Consequently, it is possible to have two types of turbulent combustion zones as shown in FIG. 1; a pilot combustion zone P generating a fuel-rich flame due to a low air flow, and a multipoint combustion zone M generating a fuel-lean flame due to a high air flow.

Nevertheless, combustion chambers equipped with injection systems of the type described above have relatively high emission levels of some pollutants, for example such as carbon monoxide or hydrocarbons, at low regime.

Pollutant emission levels depend on the quality of fuel combustion in these combustion chambers, and therefore particularly on the quality of atomisation and evaporation of fuel originating from the injectors in the injection systems, and on the presence of recirculation zones to control mixing of air and fuel in the combustion chamber.

More particularly, the case of pollutant emissions at low regime is considered herein. At low regime, as a result of the operating principle, the flame in the multipoint combustion zone M is not present and only the flame in the pilot combustion zone P is present. Thus as shown in FIG. 1, relatively large fuel droplets 60 are fairly quickly carried by centrifugal force from the central fuel injector 26 to the multipoint combustion zone M with a high air flow, which then causes poor combustion due to chemical reactions being frozen when unconsumed fuel reaches the multipoint combustion zone M with a high air flow, and thus results in the emission of pollutants at low regime. With reference to FIG. 1, freezing of the chemical reactions can start when the fuel reaches the interface between the pilot combustion zone P and the multipoint combustion zone M. Moreover, as shown in FIG. 1, fuel is injected from the central fuel injector 26 along the direction of the air flows, which considerably reduces the degree of atomisation and evaporation of the droplets 60.

Freezing of chemical reactions and injection of fuel along the direction of air flows are two phenomena that can reduce the combustion quality in the combustion chamber at low regime and can therefore increase the emission of substances noxious for the environment.

There is thus a need to be able to keep a pilot combustion zone P that is sufficiently stable and therefore turbulent, without excessive interpenetration into the multipoint combustion zone M. In particular droplets 60 originating from the central fuel injector 26 must not be centrifuged onto the annular wall 38 quickly (see FIG. 1) to form an atomised fuel film in the shear zone of flows in the pilot combustion zone P and multipoint combustion zone M. Furthermore, unlike the configuration in FIG. 1, there is a need for the fuel distribution in the pilot combustion zone P to not interfere with the multipoint combustion zone M. In the case shown in FIG. 1 according to prior art, when only the central injector 26 outputs fuel at low regime, the chemical reactions are quickly frozen by the high air flow of the multipoint combustion zone M.

In general, an improvement in the fuel distribution in the pilot combustion zone and an improvement in atomisation and evaporation of fuel originating from the pilot fuel injector in an injection system with a double fuel injection circuit is desirable at a low operating regime, in order to further reduce emission levels of substances noxious for the environment such as nitrogen oxides, carbon monoxide and hydrocarbons.

Documents WO 01/51787 A1, U.S. Pat. No. 5,833,141 A and U.S. Pat. No. 6,543,235 B1 also disclose various embodiments of prior art.

PRESENTATION OF THE INVENTION

The purpose of the invention is to at least partially satisfy the needs mentioned above and disadvantages related to embodiments according to prior art.

The invention is aimed particularly at improving control over interference between pilot and multipoint combustion zones in order to have a pilot combustion zone that is sufficiently distinct from the multipoint combustion zone and to obtain fast atomisation and evaporation of fuel originating from the pilot injector only at low operating regime.

According to one of its aspects, the purpose of the invention is thus an air and fuel injection system for an annular turbine engine combustion chamber dome comprising:

at least two fuel injection devices including a central injector and a peripheral annular injector arranged around said central injector, and an inner annular air inlet channel into which the central injector opens up to enable a mix between fuel originating from the central injector and air inlet into the inner annular channel, and at least one outer annular air inlet channel to enable enrichment of this mix with air and stabilisation of the pilot combustion zone, characterised in that the inner annular channel and said at least one outer annular channel are separated by an intermediate annular wall extending around the central injector and having a convergent inner profile.

According to the invention, it may be possible to obtain a more homogenous carbonation of the core of the pilot combustion zone and to improve control over atomisation and evaporation of the fuel from the pilot injector. A convergent air film can thus be formed around the pilot injector to "guide" the fuel flow output from the pilot injector, mainly to the pilot combustion zone and not to its periphery, at the interface with the multipoint combustion zone. This better control over combustion of fuel originating from the pilot injector can prevent freezing of chemical reactions by a high air flow from the multipoint combustion zone and can reduce emissions of polluting substances at low combustion regimes.

Throughout this description, it should be noted that the terms "upstream" and "downstream" should be considered in relation to a principal normal air and fuel flow direction F (from upstream to downstream) for an injection system. Furthermore, the terms "outer profile" and "inner profile" relate to a profile facing away from the central axis of the injection system and a profile facing towards the central axis of the injection system. Finally, the terms "convergent" and "divergent" relate to a narrowing of a considered flow and a widening of a considered flow respectively.

The injection system according to the invention may also comprise one or several of the following characteristics in isolation or in any technically possible combination.

The peripheral annular injector may be of the type currently called a multipoint injector.

The injection system according to the invention may comprise a plurality of outer annular air inlet channels, particularly at least two outer annular channels, possibly at least three or even four outer annular channels.

The outer annular channels may be radially superposed on each other and they may be radially superposed on the inner annular channel.

The intermediate annular wall extends between the inner annular channel and the outer annular channel closest to the central axis of the injection system.

The intermediate annular wall advantageously has an inner profile that is convergent towards the central axis of the injection system. Thus, "convergent inner profile" means that the inner profile of the intermediate annular wall is exclusively convergent. In particular, the case of an inner profile divergent from the central axis of the injection system, for example a convergent-divergent inner profile, is excluded. In other words, the intermediate annular wall may have a truncated neck at its end close to the nose of the central injector.

In particular, the inner profile of the intermediate annular wall may be convergent towards the central axis of the injection system such that the fuel flow sprayed by the central injector and the air flow output from the inner annular channel are approximately perpendicular. The orientation of the intermediate annular wall to enable an air flow approximately perpendicular to the fuel injection can facilitate atomisation and evaporation of fuel. The transport of fuel droplets sprayed at the outlet from the pilot injector, is then imposed by the air flow in the inner annular channel along the central axis of the injection system, and no longer by the centrifugal effect and therefore fuel can move away from the multipoint combustion zone to enable better fuel distribution in the pilot combustion zone.

Advantageously, the inner annular channel cannot generate a swirl movement. In other words, the inner annular channel is not swirled to enable such a swirl movement, in other words the inner annular channel does not have a swirler to generate a swirl movement.

The lack of such a swirl movement at the inner annular channel avoids a sudden increase in the air flow that could cause fuel to be carried to the multipoint combustion zone.

The intermediate annular wall may comprise a first upstream portion extending approximately along the central axis of the injection system and a second downstream portion convergent towards the central axis of the injection system. The length of the intermediate annular wall and particularly the length of the first portion and/or the second portion, may be chosen so that it will guide the air flow towards the nose of the central injector.

The orientation of the second portion of the intermediate annular wall towards the central axis of the injection system may be approximately the same as the orientation of the nose of the central injector.

The intermediate annular wall can extend along the central axis around the central injector and can be interrupted approximately superposed over the nose of the central injector. Thus, the intermediate annular wall can terminate in the same plane as the plane containing the nose of the central injector, this plane being approximately perpendicular to the central axis of the injection system.

Injection of air from the inner annular channel directly towards the nose of the central injector through the convergent inner profile of the intermediate annular wall can prevent flame returns and thus move the injector nose towards the pilot combustion zone, giving the advantage of a better distinction between pilot and multipoint combustion zones. The presence of a wall with a convergent-divergent inner profile forming a venturi may no longer be necessary. However, the presence of such a wall with a convergent-divergent inner profile forming a venturi, then located particularly downstream from the intermediate annular wall, can provide further prevention against flame returns if necessary, and also homogenisation between air and fuel. Furthermore, the presence of several swirled outer annular channels, in other words capable of generating a swirl movement, can give better control of recirculations between the pilot and multipoint combustion zones or can improve the mix between air and fuel.

Fins, particularly oblique fins, may pass through said at least one outer annular channel, designed to force a swirl movement about the central axis of the injection system, on the air flow passing between them. The fins may be chosen to generate a weak swirl movement. In other words, unlike the inner annular channel, said at least one outer annular channel can create a swirl movement. Introduction of such a swirl movement in said at least one outer annular channel can if necessary give better performances on combustion of fuel output from the central injector. Such a swirl movement generated in said at least one outer annular channel by the presence of fins, can generate at least one recirculation zone, and particularly a recirculation zone upstream from the pilot combustion zone and a recirculation zone downstream from the pilot combustion zone, around the pilot combustion zone formed by the central injector. Said at least one recirculation zone makes it possible to stabilise the flame generated in the pilot combustion zone.

Said at least one recirculation zone, particularly the recirculation zone located downstream from the pilot combustion zone, can also give complete combustion of the pilot combustion zone.

The aerodynamic structure and said at least one recirculation zone around the pilot combustion zone can be controlled by the presence of said outer annular air inlet channel.

The outside of said at least one outer annular channel may be delimited by an annular wall, particularly an annular wall with a convergent-divergent inner profile, in an upstream portion from which fuel ejection orifices are formed forming the peripheral annular injector. These fuel ejection orifices may open up into a peripheral annular channel in which there is an annular inlet space for an air flow that will mix with fuel output from the peripheral annular injector, in the peripheral annular channel.

This annular wall may have a convergent inner profile portion oriented towards the central axis of the injection system. This convergent inner profile portion may be superposed on the second downstream convergent portion of the intermediate annular wall. This convergent inner profile portion and the second downstream convergent portion of the intermediate annular wall may be facing the central axis of the injection system extending approximately parallel to each other.

Fins may pass through the annular air inlet space that will force a swirl movement on the air flow passing between them about the central axis of the injection system.

According to another aspect, another purpose of the invention is an annular combustion chamber for a turbine engine, characterised in that it comprises at least one injection system as defined above.

According to another aspect, another purpose of the invention is a turbine engine, characterised in that it comprises an annular combustion chamber as described above.

The annular combustion chamber and the turbine engine according to the invention may comprise any one of the above mentioned characteristics taken in isolation or in any technically possible combination with other characteristics.

BRIEF DESCRIPTION OF THE DRAWINGS

The invention will be better understood after reading the following detailed description of non-limitative example embodiments of the invention and an examination of the partial diagrammatic figures in the appended drawing in which.

Identical references in all these figures may denote identical or similar elements.

Moreover, the different parts shown in the different figures are not necessarily at the same scale to make the figures more easily readable.

DETAILED PRESENTATION OF PARTICULAR EMBODIMENTS

Figure 1:
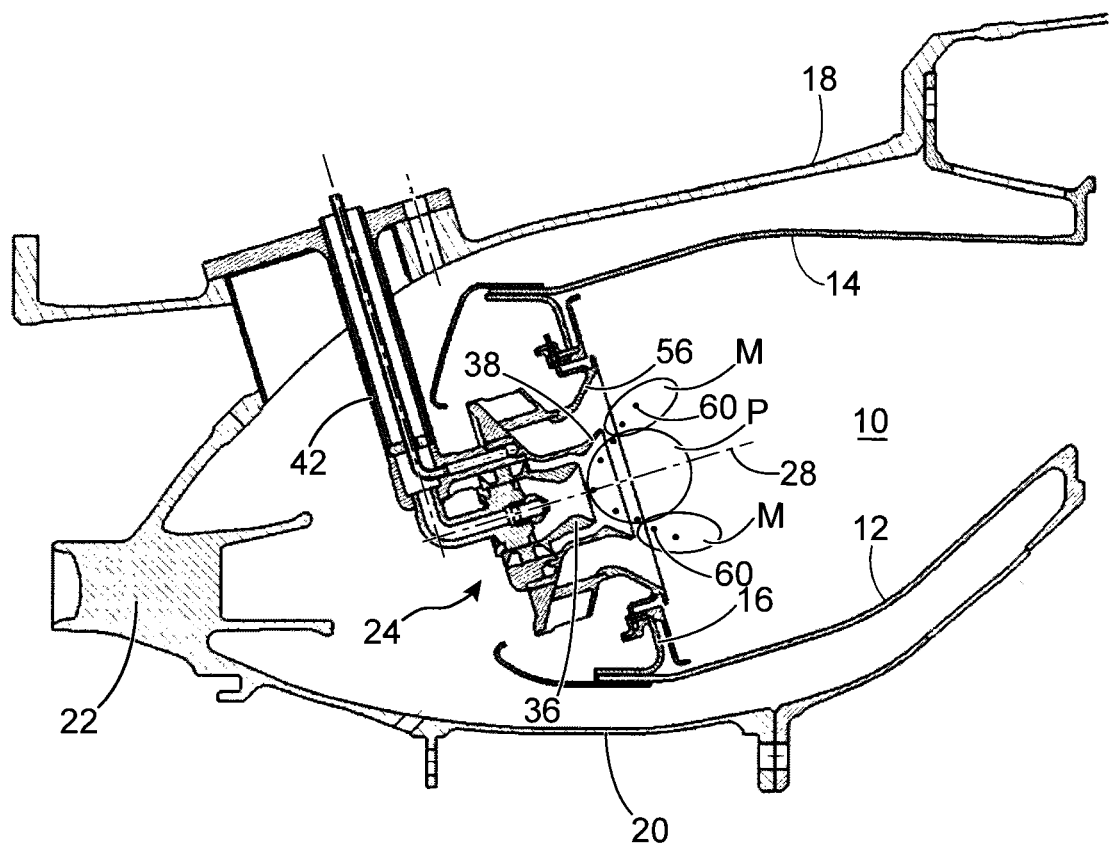
FIG. 1 is a half-axial sectional view of an annular combustion chamber of a turbine engine comprising injection systems according to prior art.
Figure 2:
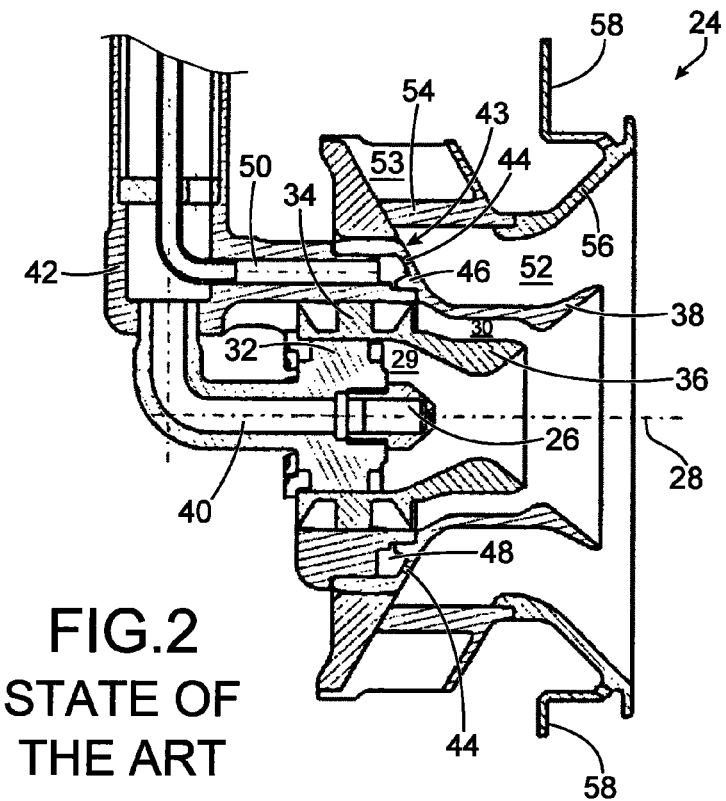
FIG. 2 is an axial sectional view at a larger scale, illustrating the injection system in the combustion chamber in FIG. 1.

FIGS. 1 and 2 that show an annular combustion chamber 10 of a turbine engine comprising injection systems 24 according to prior art have already been described above.

Figure 3:
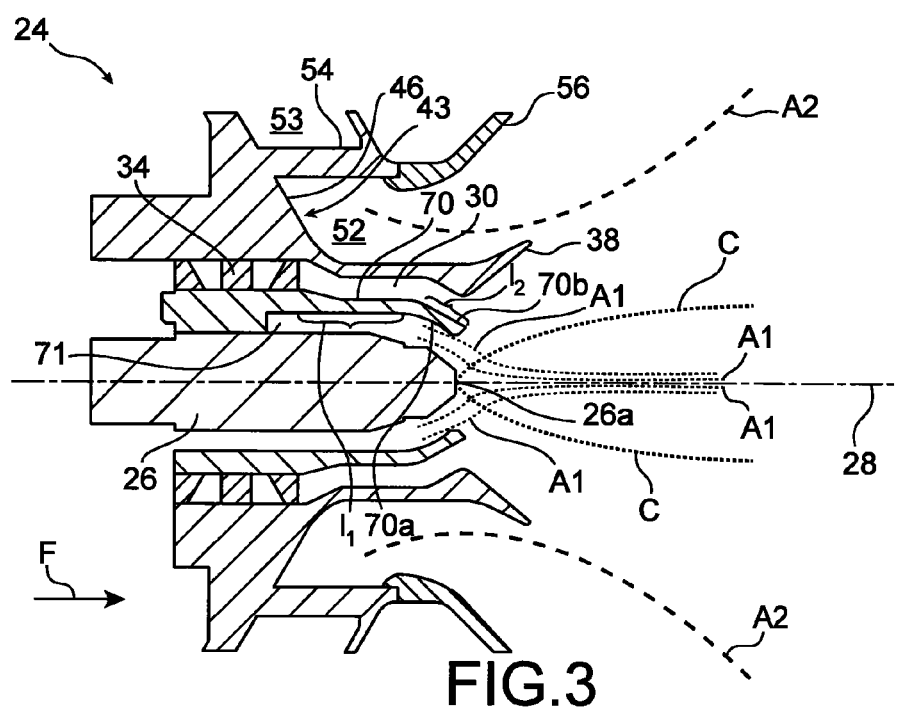
FIG. 3 is an axial sectional view of an example injection system according to the invention.
Figure 4:
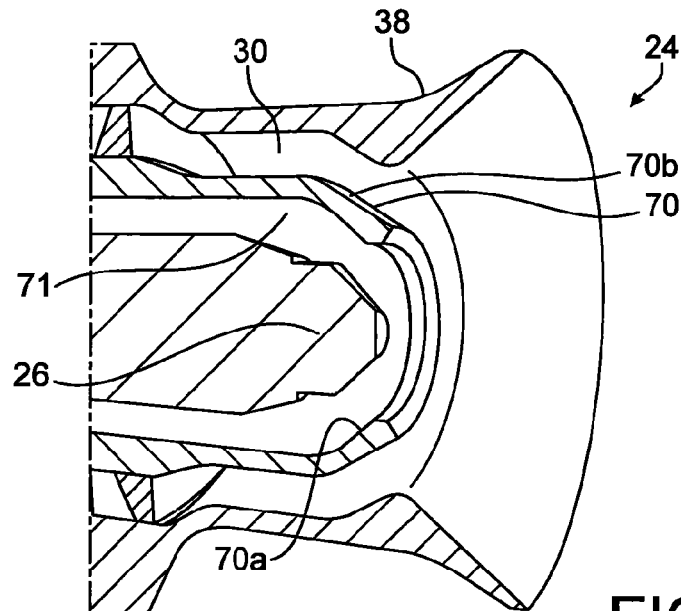
FIG. 4 is a perspective view of the pilot zone of the injection system in FIG. 3.
Figure 5:
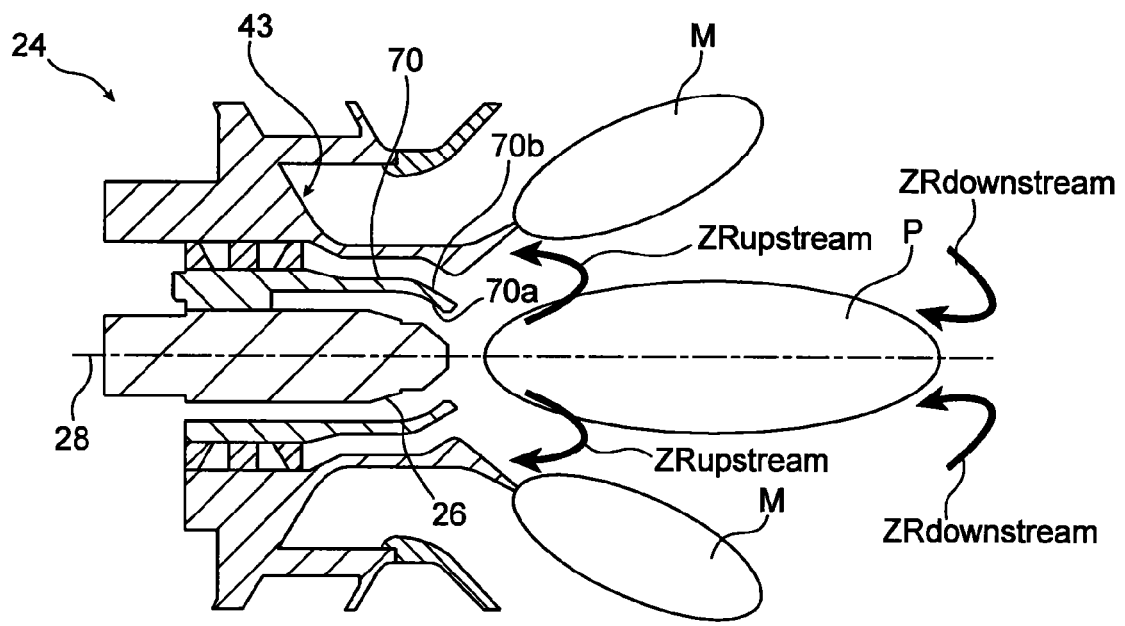
FIG. 5 is an axial sectional view, illustrating the formation of the recirculation zones, particularly between the pilot combustion zone and the multipoint combustion zone, obtained by the injection system in FIG. 3.

With reference to FIGS. 3 to 5, the figures show a first example of an injection system 24 according to the invention. FIGS. 3 and 4 show axial and perspective cross-sectional views of the injection system 24, and FIG. 5 shows the formation of recirculation zones between the pilot combustion zone and the multipoint combustion zone obtained as a result of the injection system 24.

Such an injection system 24 may be designed to be installed in an annular combustion chamber 10 of a turbine engine, particularly like that described above with reference to FIGS. 1 and 2, and it may be of a type similar to the injection system 24 in FIGS. 1 and 2. Also, only elements specific to the injection system 24 according to the invention are described below and reference may be made to the previous description concerning elements similar to those in FIGS. 1 and 2.

As can be seen particularly in FIGS. 3 and 4, the air and fuel injection system 24 comprises a central injector 26 provided with a nose 26a that can spray a flow of fuel C and a peripheral annular injector 43 arranged around the central injector 26. The peripheral annular injector 43 is in particular a multipoint type injector.

The injection system 24 also comprises an inner annular air inlet channel 71 in which the central injector 26 opens up to enable mixing between the fuel C from the central injector 26 and the air flow A1 inlet into the inner annular channel 71 to prevent excessive centrifuging of fuel droplets, and also an outer annular air inlet channel 30 generating a swirl movement, unlike the inner annular channel 71, to enable subsequent enrichment of this mix with air and to stabilise the pilot combustion zone P and to control aerodynamic structures of the pilot combustion zone P including the recirculation zones $ZR_{upstream}$ and $ZR_{downstream}$ described later with reference to FIG. 5.

According to the invention, the inner annular channel 71 and the outer annular channel 30 are separated by an intermediate annular wall 70 that extends around the central injector 26 and that has a convergent inner profile 70a.

More specifically, the intermediate annular wall 70 comprises a first upstream portion $I_1$ that extends approximately in a straight line along the central axis 28 of the injection system 24 around the central injector 26, and a second downstream portion $I_2$ that is convergent towards the central axis 28 of the injection system 24.

The intermediate annular wall 70 also extends along the central axis 28 around the central injector 26 and is then interrupted approximately where it is superposed over the nose 26a of the central injector 26, such that the air flow A1 from the inner annular channel 71 and the flow of fuel C from the nose 26a of the central injector 26 are mixed with each other in a zone with steep gradients to improve spraying.

The intermediate annular wall 70 also has a convergent outer profile 70b, facing a divergent portion of the annular wall 38.

The inner annular channel 71 and the intermediate annular wall 70 together define a convergent air film that enables more uniform carbonation of the core of the pilot combustion zone P.

The orientation of the intermediate annular wall 70 with a convergent inner profile 70a towards the central axis 28 of the injection system 24 can give a fuel C injection approximately perpendicular to the air flow A1 from the inner annular channel 71.

The injection of fuel C approximately perpendicular to the air flow A1 can impose the direction of transport of droplets of fuel C along the central axis 28 towards the pilot combustion zone P.

Advantageously, the flow of fuel C is thus at a distance from the multipoint combustion zone M to better supply the pilot combustion zone P.

FIG. 5 shows the distinction obtained between the pilot combustion zone P and the multipoint combustion zone M. Furthermore, as can be seen in FIG. 3, the fuel C flow is then at a distance from the air flow A2 originating from the peripheral annular channel 52 (also called the main swirler).

Moreover, as can be seen in FIG. 5, stabilisation of the flame at the pilot combustion zone P may require the presence of a recirculation zone $ZR_{upstream}$, close to the nose 26a of the central injector 26, and a recirculation zone $ZR_{downstream}$, downstream from the pilot combustion zone P.

The recirculation zone $ZR_{upstream}$ or $ZR_{downstream}$ may for example be generated by the swirl movement obtained as a result of the intermediate swirler (outer channel 30) and the main swirler (peripheral channel 52), which may be provided with oblique fins 34 and 54 as described above.

The aerodynamic structure and the recirculation zones $ZR_{upstream}$ and $ZR_{downstream}$ around the pilot combustion zone P can be controlled by the presence of an outer air inlet channel 30.

The formation of a convergent air film in the pilot zone of the injection system 24, obtained by the presence of the intermediate annular wall 70 provided with a convergent inner profile 70a, can give a flame in the pilot combustion zone P sufficiently distinct from the main flow of the multipoint combustion zone M to prevent freezing of combustion reactions of the pilot flame, and fast fuel supply from the central injector 26 with optimised atomisation and evaporation. In this way, it may be possible to strongly improve combustion of fuel and thus further reduce the level of emission of substances noxious for the environment.

Figure 6:
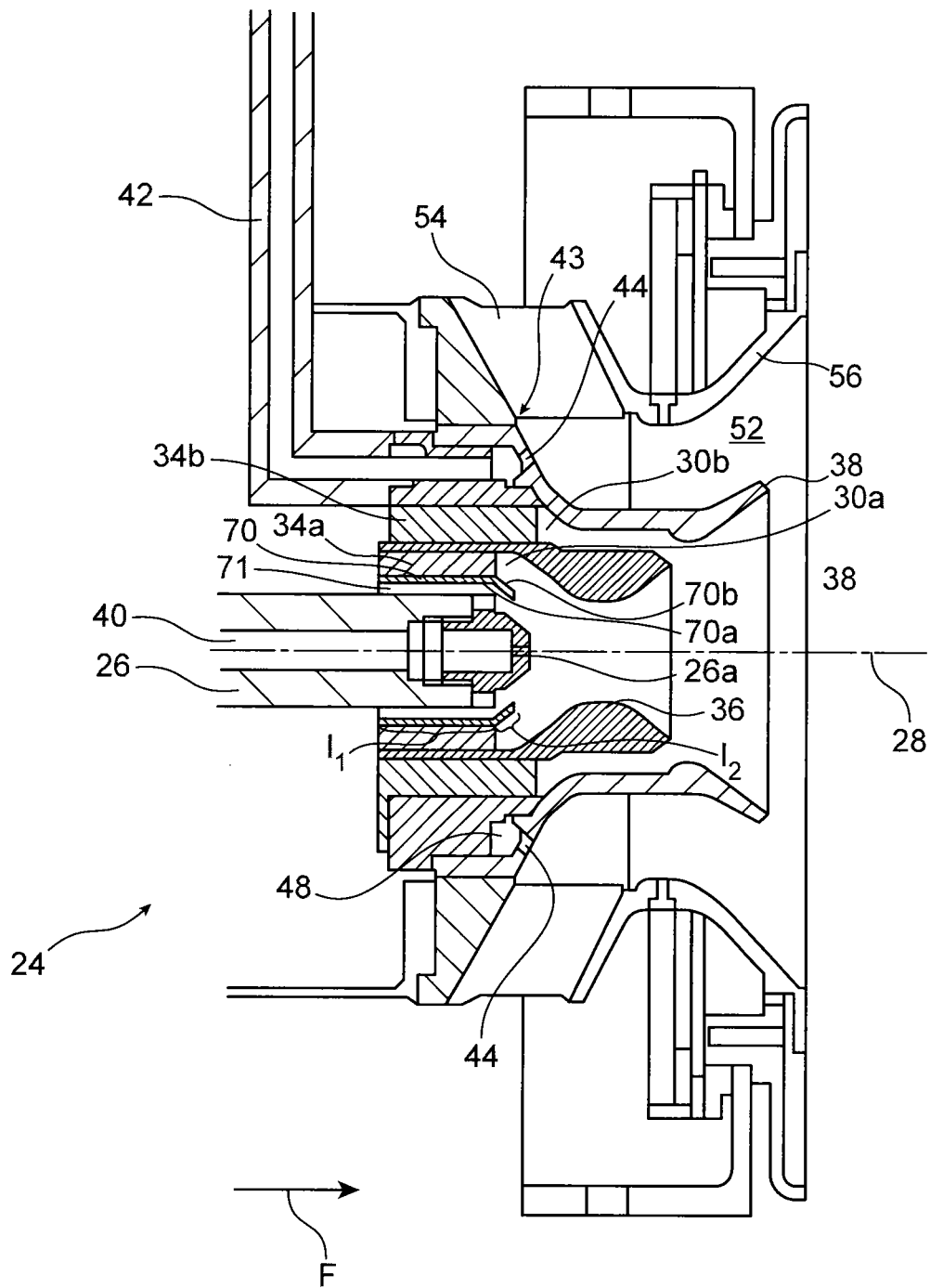
FIG. 6 is an axial sectional view, of another example injection system according to the invention.

With reference to FIG. 6, the figure shows a second example injection system 24 according to the invention.

Unlike the first example injection system 24 shown in FIGS. 3 to 5, the injection system 24 in FIG. 6 comprises two outer annular air inlet channels 30a and 30b, superposed radially on each other.

Oblique fins 34a, 34b pass through each outer annular channel 30a, 30b that will apply a swirl movement on the air flow passing between them about the central axis 28 of the injection system 24. This swirl movement can facilitate the appearance of recirculation zones $ZR_{upstream}$ and $ZR_{downstream}$, as described above.

Advantageously, the inner annular channel 71 will not generate such a swirl movement.

The intermediate annular wall 70 also comprises a first upstream portion $I_1$ that extends approximately in a straight line along the central axis 28 of the injection system 24, around the central injector 26, and a second downstream portion $I_2$ that converges towards the central axis 28 of the injection system 24.

Furthermore, the intermediate annular wall 70 extends along the central axis 28 around the central injector 26 and is then interrupted approximately where it is superposed over the nose 26*a* of the central injector 26, as described above.

The additional presence of an annular wall 36 with a convergent-divergent inner profile, or venturi 36, can also further improve the effect obtained by the intermediate annular wall 70 to prevent flame returns into the injection system 24.

Obviously, the invention is not limited to the example embodiments that have just been described. Those skilled in the art could make various modifications to them.

The expression «comprising one» should be understood as being synonymous with "comprising at least one", unless mentioned otherwise.

The invention claimed is:

1. An air and fuel injection system for an annular turbine engine combustion chamber dome comprising:
    a central fuel injector including a nose which sprays a flow of fuel;
    a peripheral annular fuel injector arranged around said central fuel injector;
    an inner annular air inlet channel in which the central fuel injector is disposed, air which is inlet into the inner annular air inlet channel forming a mix with fuel originating from the nose of the central fuel injector;
    an outer annular air inlet channel which generates a swirl movement of air which is inlet into the outer annular air inlet channel to enable enrichment of the mix with air and stabilization of a pilot combustion zone by generating an upstream recirculation zone close to the nose of the central fuel injector and a downstream recirculation zone downstream from the pilot combustion zone, the outer annular air inlet channel being disposed radially outward of the inner annular air inlet channel relative to a central axis of the injection system; and
    an intermediate annular wall extending around the central fuel injector and having a convergent inner profile that is convergent towards the central axis of the injection system such that the fuel flow sprayed by the nose of the central fuel injector and the air flow output from the inner annular air inlet channel are approximately perpendicular, the intermediate annular wall separating the inner annular air inlet channel and the outer annular air inlet channel,
    wherein the inner annular air inlet channel is free of a swirler to generate a swirl movement,
    wherein the intermediate annular wall includes a first upstream portion extending approximately along the central axis of the injection system and a second downstream portion convergent towards the central axis of the injection system, the nose of the central fuel injector being disposed downstream of the first upstream portion of the intermediate annular wall, and
    wherein the outer annular air inlet channel is delimited by the intermediate annular wall and an outer annular wall, the outer annular wall including an inner convergent divergent profile, and a downstream end of the outer annular wall being downstream of the second downstream portion of the intermediate annular wall and downstream of the nose of the central fuel injector.

2. The injection system according to claim 1, wherein the intermediate annular wall extends along the central axis of the injection system around the central fuel injector and is interrupted approximately superposed over the nose of the central fuel injector.

3. The injection system according to claim 1, comprising a plurality of outer annular air inlet channels.

4. The injection system according to claim 1, wherein fins pass through said outer annular air inlet channel.

5. An annular combustion chamber for a turbine engine, comprising at least one injection system according to claim 1.

6. A turbine engine, comprising an annular combustion chamber according to claim 5.

* * * * *